United States Patent
Pascale et al.

(10) Patent No.: US 11,221,923 B2
(45) Date of Patent: Jan. 11, 2022

(54) PERFORMING SELECTIVE BACKUP OPERATIONS

(71) Applicant: INTERNATIONAL BUSINESS MACHINES CORPORATION, Armonk, NY (US)

(72) Inventors: Alessandra Pascale, Castleknock (IE); Sebastian Lehrig, Dublin (IE); Pierpaolo Tommasi, Dublin (IE); Marco Luca Sbodio, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 16/267,809

(22) Filed: Feb. 5, 2019

(65) Prior Publication Data
US 2020/0250047 A1    Aug. 6, 2020

(51) Int. Cl.
*G06F 16/30* (2019.01)
*G06F 11/14* (2006.01)
*G06F 16/182* (2019.01)

(52) U.S. Cl.
CPC ...... *G06F 11/1464* (2013.01); *G06F 11/1469* (2013.01); *G06F 16/184* (2019.01); *G06F 2201/805* (2013.01)

(58) Field of Classification Search
CPC .................. G06F 16/184; G06F 16/275
USPC ........ 707/609, 687, 705, 769, 790, 813, 821
See application file for complete search history.

(56) References Cited

U.S. PATENT DOCUMENTS

| | | |
|---|---|---|
| 2013/0173553 A1 | 7/2013 | Apte et al. |
| 2017/0039218 A1 | 2/2017 | Prahlad et al. |
| 2017/0177867 A1* | 6/2017 | Crofton ................. G06F 21/565 |
| 2017/0262345 A1 | 9/2017 | Wang et al. |
| 2018/0260125 A1* | 9/2018 | Botes .................... G06F 16/275 |
| 2018/0322157 A1* | 11/2018 | Lee ..................... H04L 67/1095 |
| 2019/0278663 A1* | 9/2019 | Mehta ..................... G06F 3/067 |
| 2019/0356609 A1* | 11/2019 | Grunwald ............. H04L 49/356 |

* cited by examiner

*Primary Examiner* — Sana A Al-Hashemi
(74) *Attorney, Agent, or Firm* — Griffiths & Seaton PLLC (57) ABSTRACT

Various embodiments are provided for implementing intelligent backup plan creation by a processor in a computing environment. One or more files or directories managed by one or more file hosting services, cloud computing services, or a combination thereof may be identified from among a plurality of files or directories associated with a backup plan. A backup operation may be performed according to the backup plan by only referencing as opposed to including entire content of the one or more files or directories that are managed by the one or more file hosting services, the cloud computing services, or a combination thereof.

20 Claims, 7 Drawing Sheets

PERFORMING SELECTIVE BACKUP OPERATIONS

BACKGROUND OF THE INVENTION

Field of the Invention

The present invention relates in general to computing systems, and more particularly to, various embodiments for intelligent backup plan creation for performing adaptive, selective backup operations environment by a processor in a computing environment.

Description of the Related Art

In today's society, consumers, businesspersons, educators, and others communicate over a wide variety of mediums in real time, across great distances, and many times without boundaries or borders. A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for implementing intelligent backup plan creation and selective backup execution by a processor, are provided. In one embodiment, by way of example only, a method for implementing intelligent backup plan creation for performing adaptive, selective backup operations environment, again by a processor in a computing environment, is provided. One or more files or directories managed by one or more file hosting services, cloud computing services, or a combination thereof may be identified from among a plurality of files or directories associated with a backup plan. A backup operation may be performed according to the backup plan by only referencing as opposed to including entire content of the one or more files or directories that are managed by the one or more file hosting services, the cloud computing services, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

File hosting services (e.g., an online versioning system), cloud storage services, online file storage providers, or cyberlockers are internet hosting services specifically designed to host user files. These computing services enable one or more users to collaborate, store, update, revise, and/or backup data. For example, a version control system may keep track of all work and all changes in a set of files and allows. That is, version control (e.g., "revision control") is the management of one or more changes, updates, revision to data, computing applications, or other types of digital information. On the other hand, cloud computing is the delivery of computing, as a service, rather than a product, whereby shared resources, such as, software, and information of the cloud are provided to computers and other devices, over a network. Cloud computing concepts include, for example, automation, virtualization, metering, and monitoring. Cloud resources are usually not only shared by multiple users, but they are also dynamically reallocated per demand.

Currently, file host services such as, for example, versioning systems and cloud storage systems, work orthogonally to backup systems and do not share any information with each other. Additionally, dependency and package manager/management systems require only a configuration file, but all of the data stored locally by such systems may be easily downloaded again and require no further backup. However, a typical problem with traditional backup system is that they redundantly backup files (and their history) also for files that are already stored in file host services or versioning systems or cloud storage systems or managed by package managers. An additional challenge is that traditional backup systems only allow for manual configuration of including/excluding files/directories for a backup. At most, only a list of common files/directories is available (e.g., include only a home directory). That is, current backup systems only allow a user to specify an inclusion/exclusion list of files and/or directories to back-up/not-back-up. Instead, the present invention may intelligently/cognitively identify some of these files in an automatic way.

Accordingly, the present invention provides for automatically identifying and excluding from a backup those files that are already stored elsewhere, while keeping an updated reference to their location for future restore. In one aspect, the present invention provides for a cognitive system that implements intelligent backup plan creation for performing adaptive, selective backup operations in a computing environment. One or more files or directories managed by one or more file hosting services, cloud computing services, or a combination thereof may be identified from among a plurality of files or directories associated with a backup plan. A backup operation may be performed according to the backup plan by only referencing as opposed to including entire content of the one or more files or directories that are managed by the one or more file hosting services, the cloud computing services, or a combination thereof.

To illustrate, consider the following example. In a first example, assume user 1 stores photographs/pictures in file hosting service A and working documents in file hosting service B. Assume user 1 has a storage device (e.g., a universal serial bus "USB" storage device) with limited memory which user 1 wants to use as backup. Assume now user 1 desires to back up a personal folder located on a personal computer, but the pictures in file hosting service A will consume an excess amount of space and the documents on file hosting service B, because of their confidentiality, can be stored on the enterprise cloud but not in an unencrypted storage system. Currently, user 1 is only able to manually exclude those folders (e.g., pictures and/or working document) from the backup. Thus, the present invention provides for automatically skipping these folders (e.g., pictures and/or working document) by only using, maintaining, and/or keeping a reference to their original location (respectively, file hosting service A and file hosting service B). If a restore is necessary, fetching the files will be delegated respectively to the file hosting service A and file hosting service B.

In a second example, assume user 2 is a software engineer, and user 2 uses a web-based hosting service (e.g., online versioning system) for version control for all software projects and tracking changes to a computer file and coordinating work on those files with multiple users. Assume also user 2 uses several dependency managers to handle the library dependencies for the software projects. User 2 desires to back up a laptop but does not want to duplicate the source code that is already available in the versioning system, and the libraries managed by the dependency managers. Currently, user 2 must manually specify all the locations he wants to include/exclude from the backup. In contrast, using the illustrated embodiments as described herein, user 2 can automatically identify versioned projects and avoid duplicating the content of their folders. If any files in those projects are not yet versioned, the present invention would backup only those files. Additionally, the present invention would avoid backing up directories which can be automatically restored by a software dependency manager.

Thus, the cognitive system of the present invention receives, as input, a file system to back up without requiring any specific constraints and/or configurations (e.g., account detains for an online versioning system and cloud storage system). Upon processing the input, the cognitive system may provide a plan for selective backup of the file system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
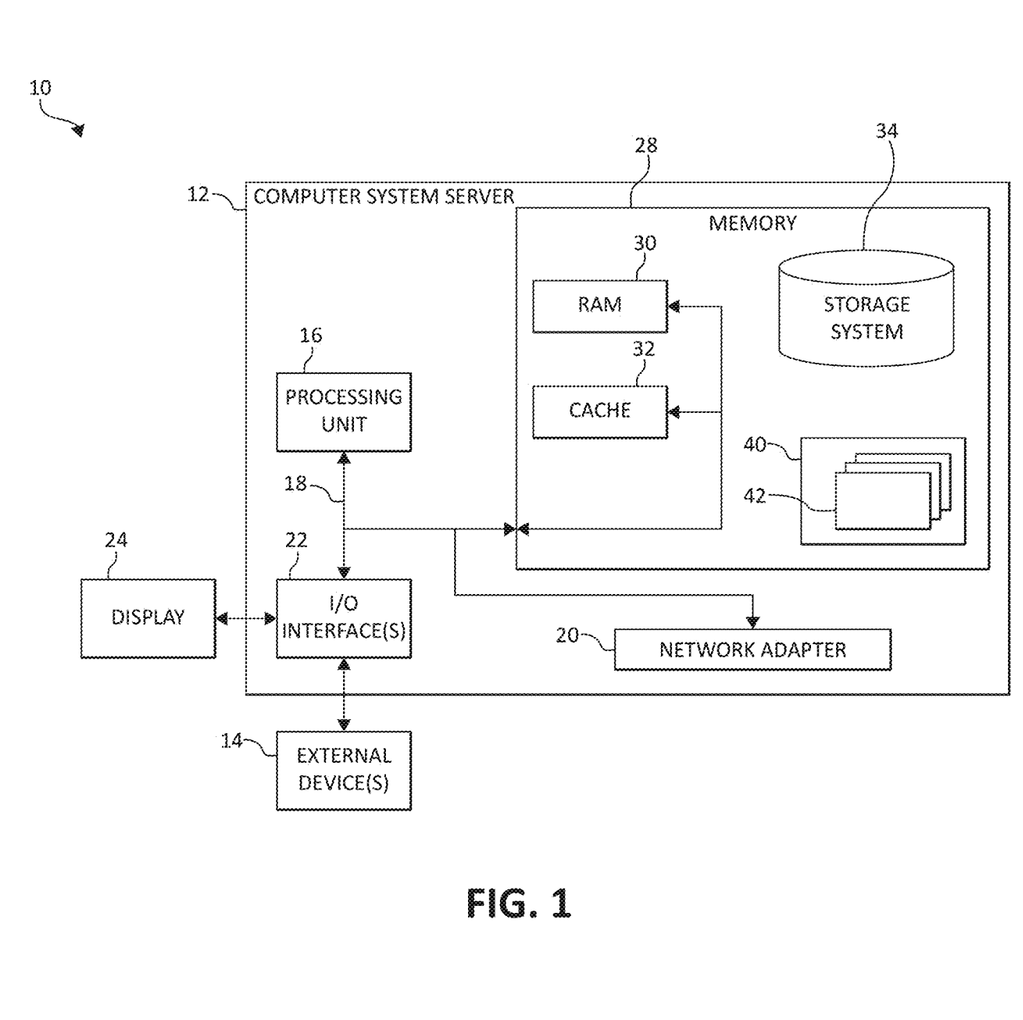
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
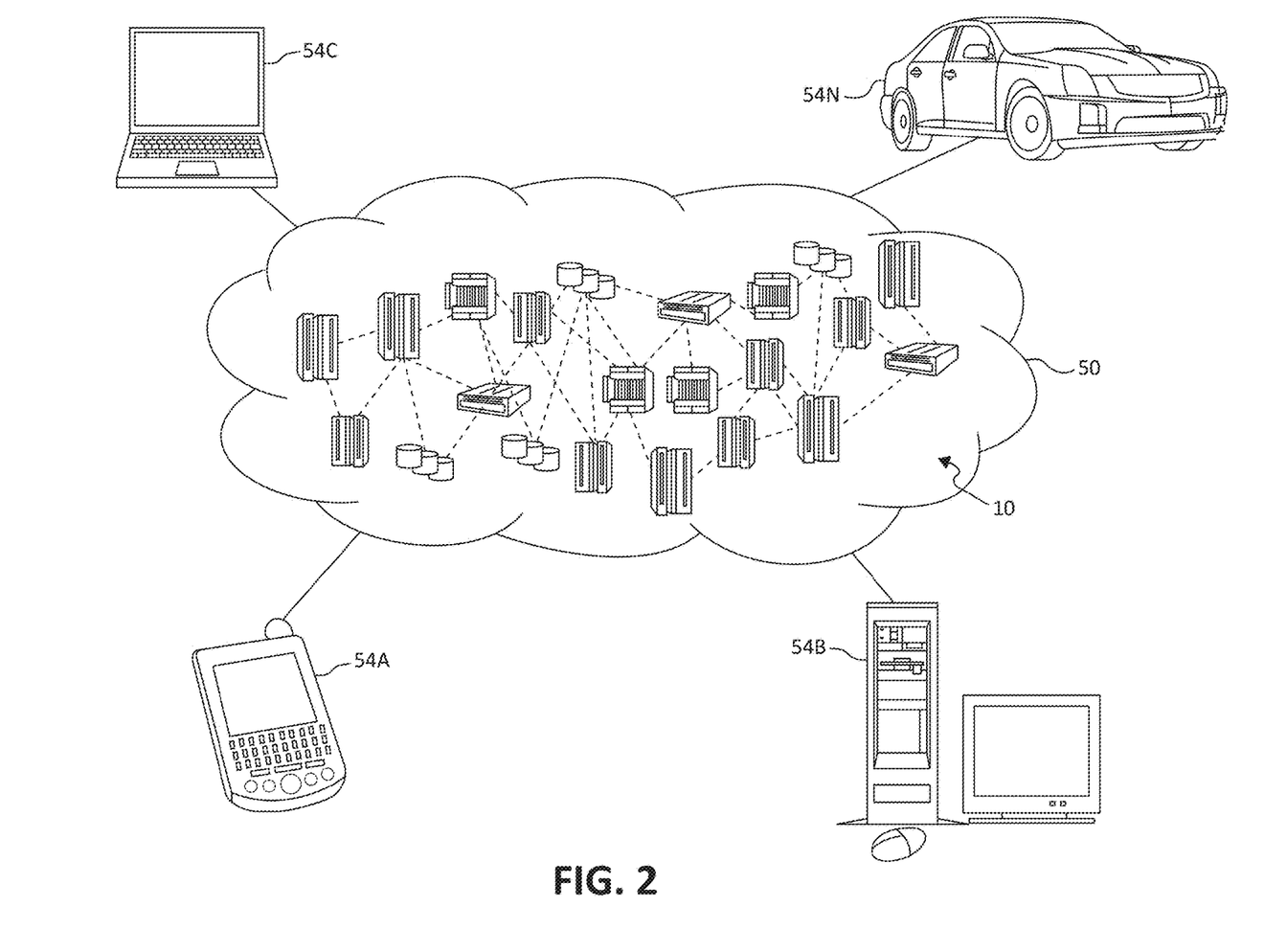
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
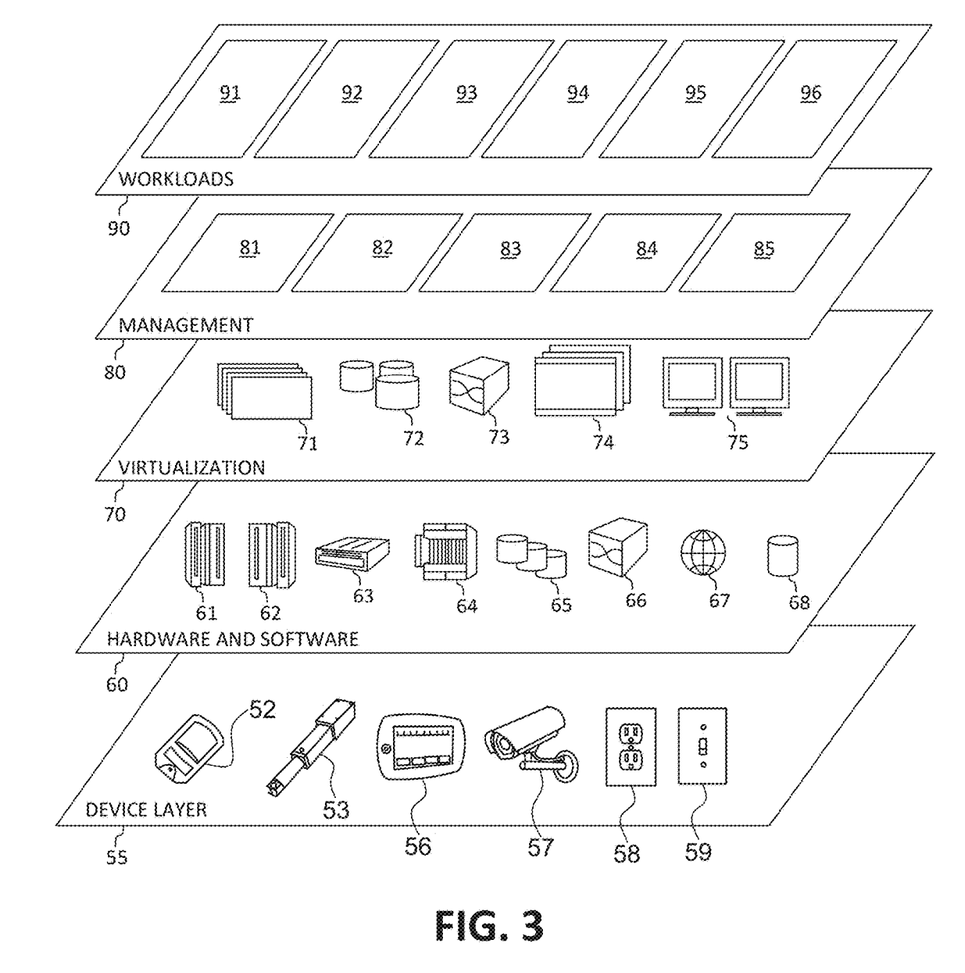
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent backup plan creation for performing adaptive, selective backup operations. In addition, workloads and functions 96 for intelligent backup plan creation for performing adaptive, selective backup operations may include such operations as data analytics, data analysis, and as will be further described, notification functionality. One with ordinary skill in the art will appreciate that the workloads and functions 96 for intelligent backup plan creation for performing adaptive, selective backup operations may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides a cognitive system that implements an intelligent backup plan creation for performing adaptive, selective backup operations. In one aspect, the cognitive system may automatically identify and exclude the files/directories that are already saved/versioned elsewhere (e.g., in a versioning system or cloud computing environment). The files/directories may be automatically retrieved from the online versioning systems and/or cloud storage systems.

In an additional aspect, the present invention provides a cognitive system that automatically create a backup plan for a file system, which includes only references (as opposed to the whole content) to 1) directories/files managed by online versioning systems and/or cloud storage systems that are fully synchronized by such systems at the time of the backup, and/or 2) directories/files downloadable from the Internet and managed by package/library managers application.

In an additional aspect, the present invention supports intelligent restore of directories/files from a previously generated backup plan by 1) retrieving the directories/files managed by online versioning systems and/or cloud storage systems that were fully synchronized by such systems at the time of the backup, and 2) restoring from the backup the directories/files managed by online versioning systems and/or cloud storage systems that were not fully synchronized by such systems at the time of the backup. Any conflicts between versioned directories/files may be automatically resolved.

Thus, as described herein, the present invention seeks to avoid storing in a backup operation those files/directories that are already managed by another computing system (e.g., an "online management system") such as, for example, a cloud store, a version control system, and/or a package manager used by developers. For those managed items (e.g., files and/or directories), the present invention only stores a reference (as opposed to the actual content) that allows for retrieving the item from the online management system when restoring the backup.

Figure 5:
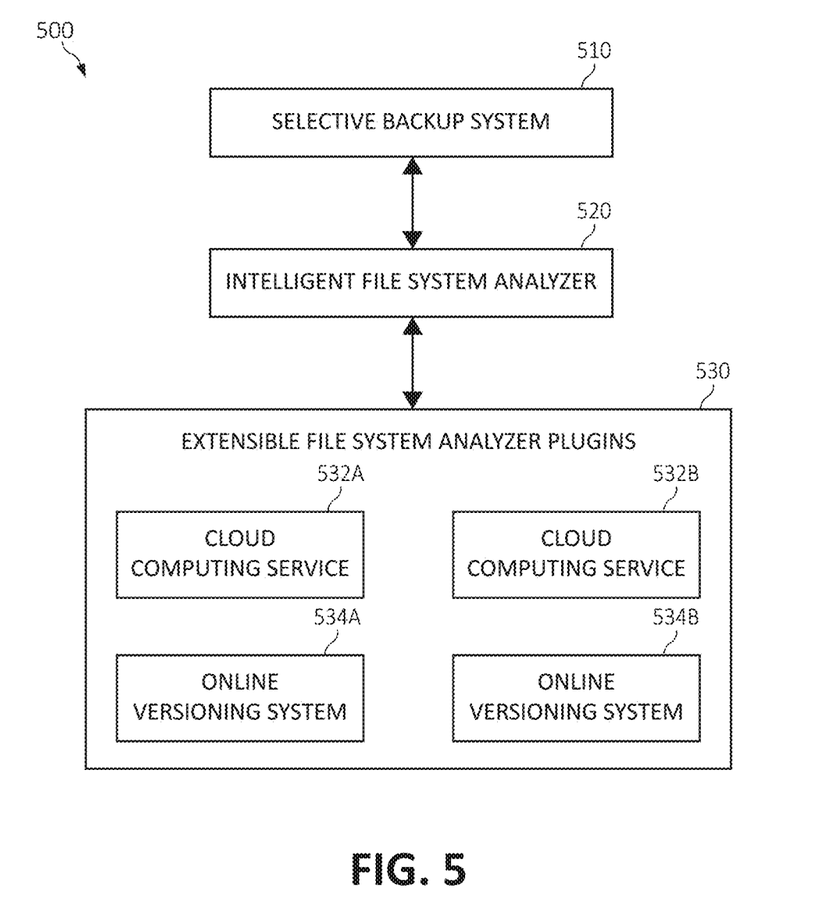
FIG. 5 is a diagram depicting subnet/switch generalization for intelligent backup plan creation and selective backup execution in accordance with aspects of the present invention.

Our invention relies on an extensible set of plug-ins that are able to communicate with the different "online management systems" to identify managed items (e.g., files and/or directories) and properly handle them using one or more plug-ins such as, for example, one or more extensible file system analyzer plugins 530 of FIG. 5.

Figure 4:
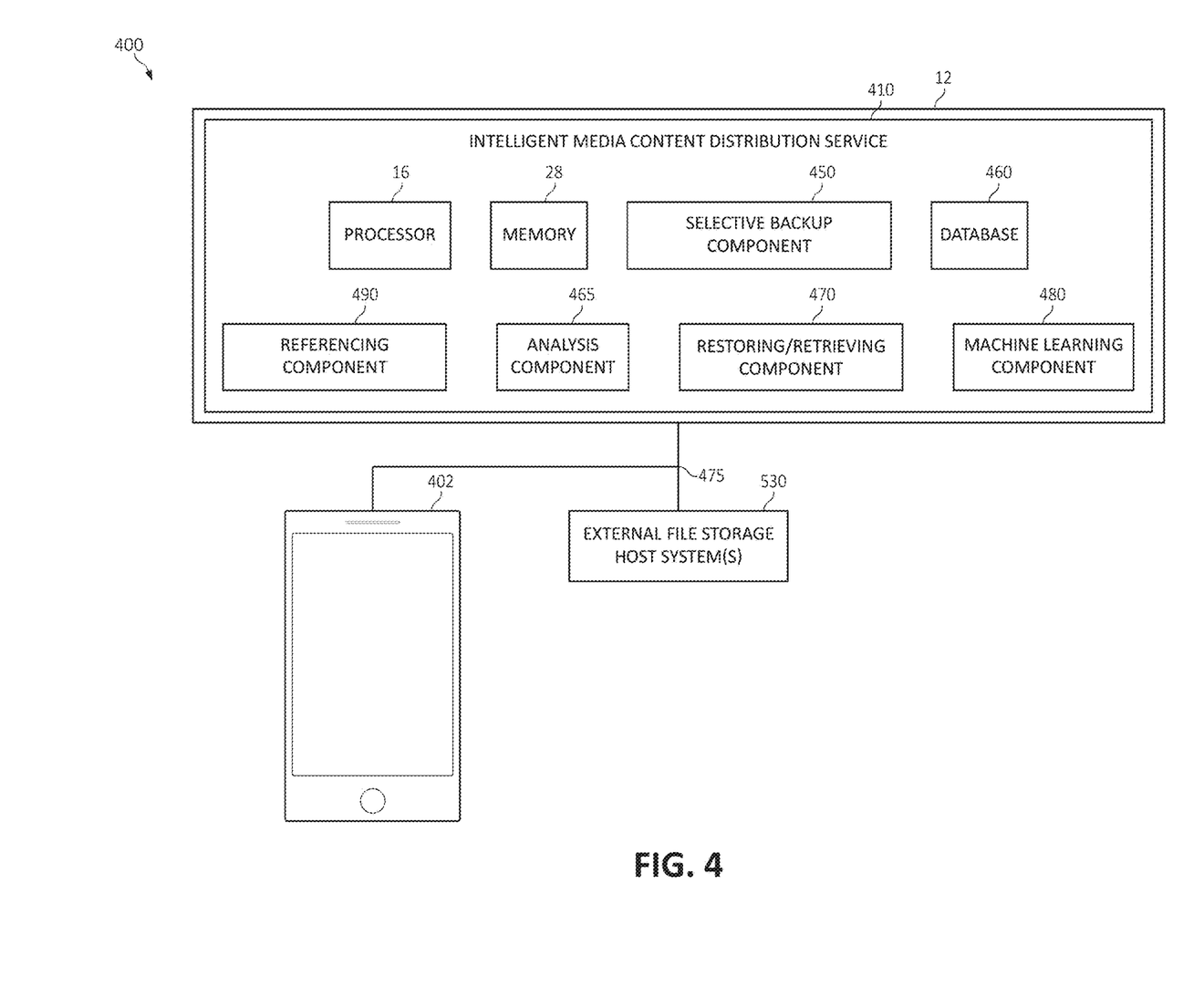
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4.

An intelligent backup plan creation and execution service 410 is shown, incorporating processing unit 16 ("processors") and memory 28 of FIG. 1 to perform various computational, data processing and other functionality in accordance with various aspects of the present invention. The intelligent backup plan creation and execution service 410 may be provided by the computer system/server 12 of FIG. 1. The intelligent backup plan creation and execution service 410 may be provided by the computer system/server 12 of FIG. 1. The intelligent backup plan creation and execution service 410 may include a selective backup component 450, a database 460, a referencing component 490, an analysis component 465, a restoring/retrieving component 455, and a machine learning component 480 (e.g., machine learning model component).

As one of ordinary skill in the art will appreciate, the depiction of the various functional units in the intelligent backup plan creation and execution service 410 is for purposes of illustration, as the functional units may be located within the intelligent backup plan creation and execution service 410 or elsewhere within and/or between distributed computing components.

The intelligent backup plan creation and execution service 410 may be in communication with and/or association with one or more computing devices (e.g., user equipment "UE") such as, for example UE 402 (e.g., an internet of things "IoT" computing device such as, for example, a smartphone, smartwatch, desktop computer, laptop computer, tablet, and/or another electronic device that may have one or more processors and memory and configured for capturing images or video data). The UE 402 and the intelligent backup plan creation and execution service 410 may each be associated with and/or in communication with each other, by one or more communication methods, such as a computing network, wireless communication network, or other network means enabling communication.

The intelligent backup plan creation and execution service 410 and the UE 402 may also be in communication with an external file storage host system 430 (e.g., a file hosting services, a cloud computing services, or a combination thereof), by one or more communication methods, such as a computing network 475, wireless communication network, or other network means enabling communication with the external file storage host system 430.

In one aspect, the intelligent backup plan creation and execution service 410 may provide virtualized computing services (i.e., virtualized computing, virtualized storage, virtualized networking, etc.) to the one or more UE 402 (see also computing devices 54A-N of FIG. 2). More specifically, the intelligent backup plan creation and execution service 410 may provide, and/or be included in, a virtualized computing, virtualized storage, virtualized networking and other virtualized services that are executing on a hardware substrate.

The intelligent backup plan creation and execution service 410 may also function as a database, using database 460, and/or service that may store, maintain, and update data, services, and/or resources internal to and/or external to the intelligent backup plan creation and execution service 410. In one aspect, intelligent backup plan creation and execution service 410 may assist in providing access to and/or assist in performing one or more various types of data, services and/or resources.

The selective backup component 450, in association with the analysis component 465 (e.g., a file system analyzer), may identify one or more files or directories managed by one or more file hosting services, cloud computing services, or a combination thereof and perform a backup operation according to a backup plan by only referencing the one or more files or directories that are managed by the one or more file hosting services, the cloud computing services, or a combination thereof.

The referencing component 490 may maintain and update each reference to the one or more files or directories managed by the external file storage host system 430 (e.g., a file hosting services, a cloud computing services, or a combination thereof). The referencing component 490 may restore the one or more files or directories from a previous backup plan. The referencing component 490 may also retrieve the one or more files or directories from the external file storage host system 430 that are synchronized during the backup operation. The referencing component 490 may restore the one or more files or directories from the external file storage host system 430 that are unsynchronized during the backup operation.

Returning back to the selective backup component 450, the selective backup component 450, in association with the machine learning component 480, may resolve a conflict between versions of the one or more files or directories managed by the external file storage host system 430 that are synchronized between the backup operation. The selective backup component 450 may backup the one or more files or directories to a secondary backup system upon such as, for example database 460 and/or an additional external file storage host system upon the external file storage host system 430 being unavailable at the time of performing the backup.

Furthermore, the machine learning component 480 may learn the various types of data, files, directories, or a combination thereof that are externally managed by the external file storage host system 430. The machine learning component 480 may plan a selective backup of a file system and learning each backup plan.

The machine learning component 480 may use one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Turning now to FIG. 5, a diagram depicts an intelligent backup plan creation and execution service 500. In one aspect, one or more of the components, modules, services, applications, and/or functions described in FIGS. 1-3 may be used in FIG. 4.

An intelligent file system analyzer 520 is shown which may incorporate processing unit 16 ("processors") and memory 28 of FIG. 1 to perform various computational, data processing and other functionality in accordance with various aspects of the present invention. The intelligent file system analyzer 520 may be provided by the computer system/server 12 of FIG. 1.

The intelligent file system analyzer 520 may be in communication with a selective backup system 510. The intelligent file system analyzer 520 may also be in communication, via one or more extensible file system analyzer plugins 530, with one or more file hosting systems such as, for example, cloud computing service 532A, 532B and/or online versioning system 534A, 534B.

The intelligent file system analyzer 520 may responsible for scanning a file system given as input and builds/generates a plan comprising the directories and files to backup. The intelligent file system analyzer 520 may rely on one or more extensible file system analyzer plugins 530. Each of the one or more extensible file system analyzer plugins 530 may identify specific directories/files that are managed/used by the cloud computing service 532A, 532B and/or online versioning system 534A, 534B. Each of the extensible file system analyzer plugins 530 may natively communicates with the specific versioning or cloud storage system (e.g., the cloud computing service 532A, 532B and/or online versioning system 534A, 534B) to retrieve a state of the managed directories/files. The intelligent file system analyzer 520, using the extensible file system analyzer plugins 530, may determine/decides if the identified directories/files need to be included/excluded from a current back-up plan.

In an additional embodiment, the selective backup system 510 may include an additional online backup service that backs up the files that are excluded by the intelligent file system analyzer 520 by directly connecting to an external versioning and cloud storage systems (e.g., the cloud computing service 532A, 532B and/or online versioning system 534A, 534B). This may be useful in case the external versioning and cloud storage systems are unavailable at restore time.

Figure 6:
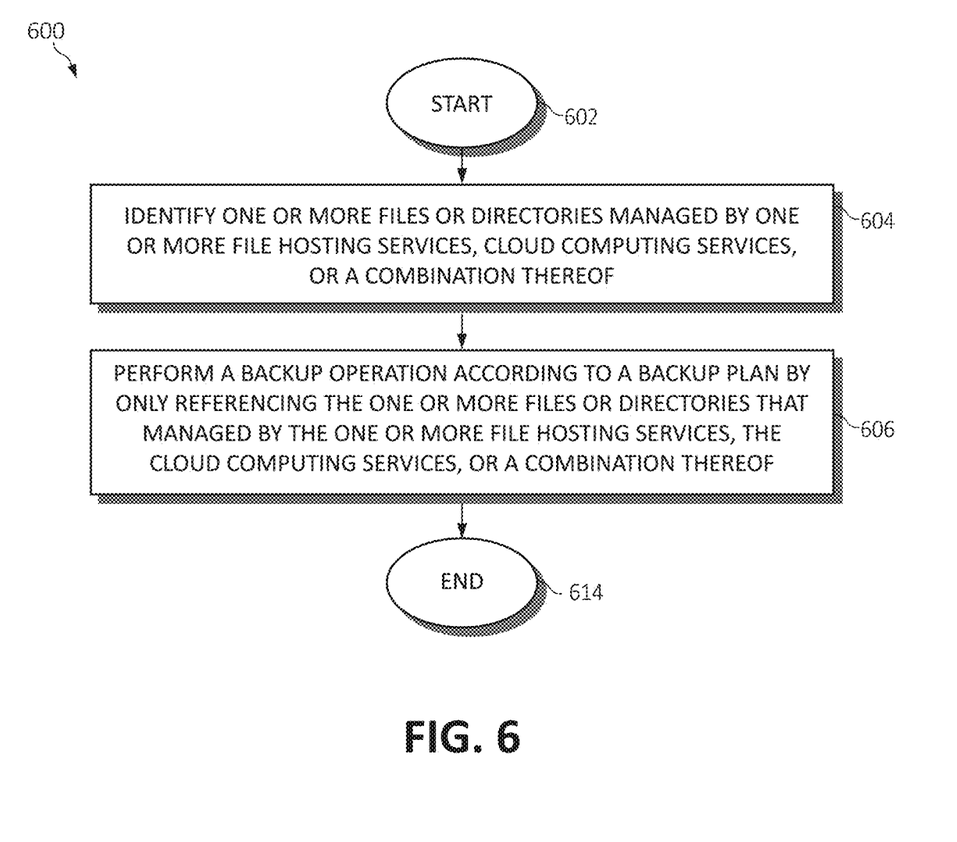
FIG. 6 is a flowchart diagram depicting an exemplary method for implementing an intelligent backup plan creation and selective backup execution in a computing environment in which various aspects of the present invention may be realized.

FIG. 6 is an additional flowchart diagram 600 depicting an exemplary method for intelligent backup plan creation in a computing environment, again in which various aspects of the present invention may be realized. In one aspect, one or more of the components, modules, services, applications, and/or functions described in FIGS. 1-5 may be used in FIG. 6. The functionality 600 may be implemented as a method executed as instructions on a machine, where the instructions are included on at least one computer readable medium or one non-transitory machine-readable storage medium. The functionality 600 may start in block 602.

One or more files or directories managed by one or more file hosting services, cloud computing services, or a combination thereof may be identified from among a plurality of files or directories associated with a backup plan, as in block 604. A backup operation may be performed according to the backup plan by only referencing as opposed to including entire content of the one or more files or directories that are managed by the one or more file hosting services, the cloud computing services, or a combination thereof, as in block 606. The functionality 600 may end, as in block 608.

In one aspect, in conjunction with and/or as part of at least one block of FIG. 6, the operations of method 600 may include each of the following. The operations of method 600 may maintain and update references to the one or more files or directories managed by the one or more file hosting services, the cloud computing services, or a combination thereof, and restore the one or more files or directories from a previous backup plan.

In an additional aspect, the operations of method 600 may retrieve the one or more files or directories from the one or more file hosting services, the cloud computing services, or a combination thereof that are synchronized during the backup operation, and/or restore the one or more files or directories from the one or more file hosting services, the cloud computing services, or a combination thereof that are unsynchronized during the backup operation.

The operations of method 600 may resolve a conflict between versions of the one or more files or directories managed by the one or more file hosting services, the cloud computing services, or a combination thereof that are synchronized between the backup operation, and/or back up the one or more files or directories to a secondary backup system upon the one or more file hosting services, the cloud computing services, or a combination thereof being unavailable at the time of performing the backup.

Figure 7:
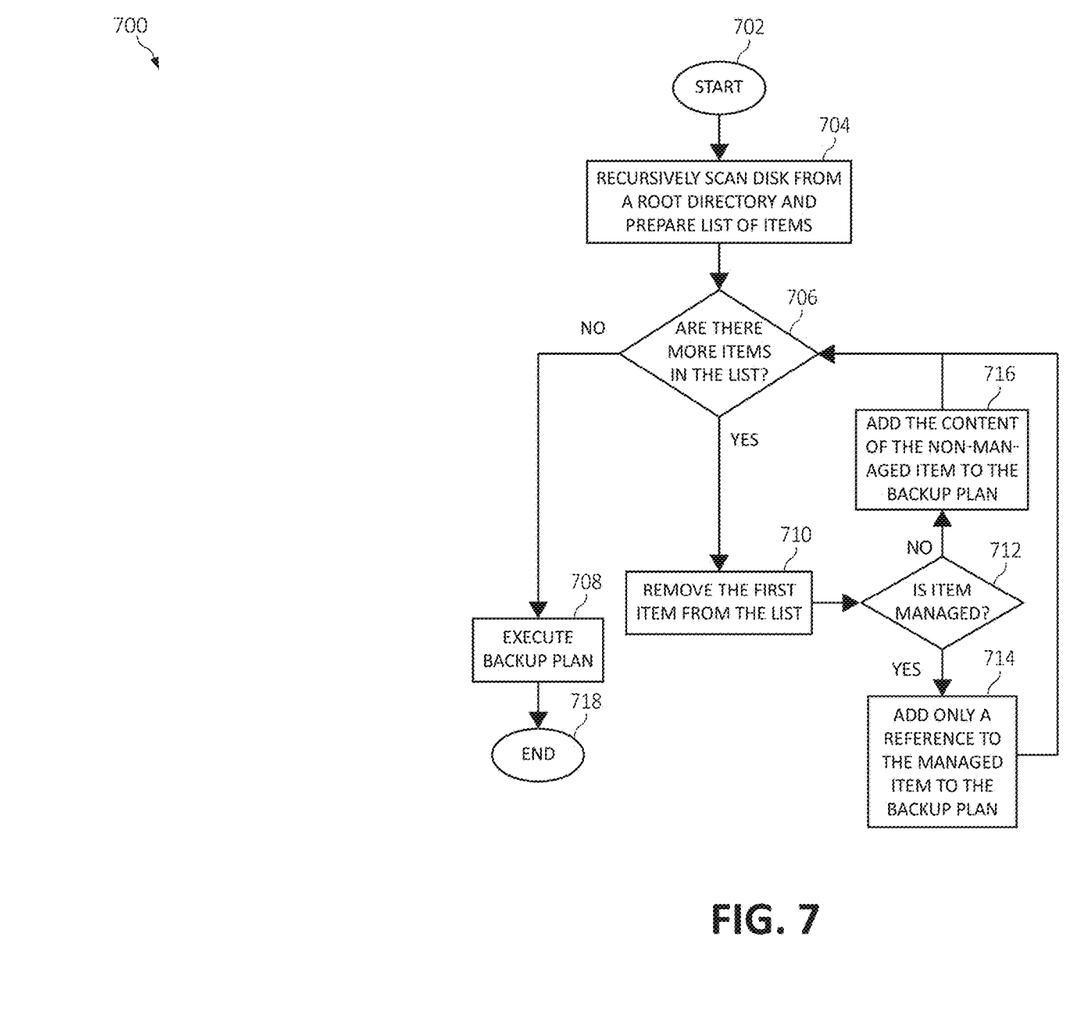
FIG. 7 is a flowchart diagram depicting an exemplary method for implementing an intelligent backup plan creation and selective backup execution in a computing environment, again in which various aspects of the present invention may be realized.

Turning now to FIG. 7 is an additional flowchart diagram 700 depicting an exemplary method for intelligent backup plan creation in a computing environment, again in which various aspects of the present invention may be realized. In one aspect, one or more of the components, modules, services, applications, and/or functions described in FIGS. 1-5 may be used in FIG. 7. The functionality 700 may be implemented as a method executed as instructions on a machine, where the instructions are included on at least one computer readable medium or one non-transitory machine-readable storage medium. The functionality 700 may start in block 702.

A disk (or other memory device) may be recursively scanned from a root directory and a list of items (e.g., files and/or directories) may be prepared, as in block 704. As used herein, by way of example only, an item may be a file or a directory. A determination operation may be executed to determine if there are additional items in the list of items, as in block 706. If no at block 706, the functionality 700 may move to block 708 and execute a backup plan.

When executing a backup plan (e.g., via the selective backup system 510 of FIG. 5), as in block 708, 1) the content of one or more unmanaged files may be stored on the backup, a reference to the managed items may be stored on the backup. The reference to the managed items may be considered smaller in size (e.g., storage size) than the content of the unmanaged items and enables a download from the managing storage system (e.g., cloud storage system, version control system, etc.) at a restore time.

If yes at block 706, the functionality 700 may move to block 710. The first item from the list of items (e.g., files and/or directories) may be removed, as in block 710.

A determination operation may be executed to determine if the item being removed is a managed item (e.g., managed file and/or directory such as, for example, an online versioning system), cloud storage services, online file storage providers, etc.), as in block 712. It should be noted, for execution of block 712, that an item may be considered as being "managed" by a managing storage system if: 1) the item is stored in a cloud storage system, 2) the items is stored in a remote version control system, and/or 3) the items is managed by a package manager. Also, for example, the determination operation may be executed to determine if the item being removed is a managed item using the intelligent file system analyzer 520 and the one or more extensible file system analyzer plugins 530. That is, one or more specific plug-ins may be used for each type of storage system (e.g., the cloud storage system, the version control system, or package manager such as, for example, cloud computing service 532A, 532B and/or online versioning system 534A, 534B of FIG. 5).

If yes at block 712, the functionality 700 may move to block 714. At block 714, only a reference to the managed item is added to a backup plan and the functionality 700 moves back to block 706. If no at block 712, the functionality 700 may move to block 716. At block 716, the content of the non-managed items is added to the backup plan and the functionality 700 moves back to block 706.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent backup plan creation by a processor in a computing environment, comprising:

recursively scanning, commencing with a root directory, a plurality of data on a storage device of a host computer to generate a list of a plurality of files or directories to include in a backup plan;

in conjunction with generating the list and during the scanning, determining whether currently scanned data of the plurality of files or directories in the recursive scan comprises one or more files or directories managed by one or more file hosting services, cloud computing services, or a combination thereof;

in response to determining the currently scanned data comprises the one or more files or directories managed by one or more file hosting services, cloud computing services, or a combination thereof, executing one or more extensible file system analyzer plugins, by the host, to obtain a state of the currently scanned data within the one or more file hosting services, cloud computing services, or a combination thereof, wherein obtaining the state includes natively communicating, by the one or more file system analyzer plugins on the host, with a respective one of the one or more file hosting services or cloud computing services on which the currently scanned data resides to determine whether the currently scanned data is to be excluded from the backup plan;

in response to determining the currently scanned data should be excluded from the backup plan, generating a reference to the currently scanned data in the backup plan; and performing a backup operation to backup those of the plurality of files or directories to a second storage device unassociated with the one or more file hosting services, cloud computing services, or a combination thereof according to the backup plan by only referencing within the backup to the second storage device, as opposed to including, entire content of the one or more files or directories that are managed by the one or more file hosting services, the cloud computing services, or a combination thereof, wherein the referencing includes backing up, within the storage device, only the reference to a current location of the managed one or more files or directories stored in the one or more file hosting services, the cloud computing services, or a combination thereof.

2. The method of claim 1, further including maintaining and updating references to the one or more files or directories managed by the one or more file hosting services, the cloud computing services, or a combination thereof.

3. The method of claim 1, further including restoring the one or more files or directories from a previous backup plan.

4. The method of claim 1, further including retrieving the one or more files or directories from the one or more file hosting services, the cloud computing services, or a combination thereof that are synchronized during the backup operation.

5. The method of claim 1, further including restoring the one or more files or directories from the one or more file hosting services, the cloud computing services, or a combination thereof that are unsynchronized during the backup operation.

6. The method of claim 1, further including resolving a conflict between versions of the one or more files or directories managed by the one or more file hosting services, the cloud computing services, or a combination thereof that are synchronized between the backup operation.

7. The method of claim 1, further including backing up the one or more files or directories to a secondary backup system upon the one or more file hosting services, the cloud computing services, or a combination thereof being unavailable at a time of performing the backup.

8. A system for implementing intelligent backup plan creation by a processor in a computing environment, comprising:
one or more computers with executable instructions that when executed cause the system to:
recursively scan, commencing with a root directory, a plurality of data on a storage device of a host computer to generate a list of a plurality of files or directories to include in a backup plan;
in conjunction with generating the list and during the scanning, determine whether currently scanned data of the plurality of files or directories in the recursive scan comprises one or more files or directories managed by one or more file hosting services, cloud computing services, or a combination thereof;
in response to determining the currently scanned data comprises the one or more files or directories managed by one or more file hosting services, cloud computing services, or a combination thereof, execute one or more extensible file system analyzer plugins, by the host, to obtain a state of the currently scanned data within the one or more file hosting services, cloud computing services, or a combination thereof, wherein obtaining the state includes natively communicating, by the one or more file system analyzer plugins on the host, with a respective one of the one or more file hosting services or cloud computing services on which the currently scanned data resides to determine whether the currently scanned data is to be excluded from the backup plan;
in response to determining the currently scanned data should be excluded from the backup plan, generate a reference to the currently scanned data in the backup plan; and
perform a backup operation to backup those of the plurality of files or directories to a second storage device unassociated with the one or more file hosting services, cloud computing services, or a combination thereof according to the backup plan by only referencing within the backup to the second storage device, as opposed to including, entire content of the one or more files or directories that are managed by the one or more file hosting services, the cloud computing services, or a combination thereof, wherein the referencing includes backing up, within the storage device, only the reference to a current location of the managed one or more files or directories stored in the one or more file hosting services, the cloud computing services, or a combination thereof.

9. The system of claim 8, wherein the executable instructions further maintain and update references to the one or more files or directories managed by the one or more file hosting services, the cloud computing services, or a combination thereof.

10. The system of claim 8, wherein the executable instructions further restore the one or more files or directories from a previous backup plan.

11. The system of claim 8, wherein the executable instructions further retrieve the one or more files or directories from the one or more file hosting services, the cloud computing services, or a combination thereof that are synchronized during the backup operation.

12. The system of claim 8, wherein the executable instructions further restore the one or more files or directories from the one or more file hosting services, the cloud computing services, or a combination thereof that are unsynchronized during the backup operation.

13. The system of claim 8, wherein the executable instructions further resolve a conflict between versions of the one or more files or directories managed by the one or more file hosting services, the cloud computing services, or a combination thereof that are synchronized between the backup operation.

14. The system of claim 8, wherein the executable instructions further back up the one or more files or directories to a secondary backup system upon the one or more file hosting services, the cloud computing services, or a combination thereof being unavailable at a time of performing the backup.

15. A computer program product for implementing intelligent backup plan creation by a processor in a computing environment, the computer program product comprising a non-transitory computer-readable storage medium having computer-readable program code portions stored therein, the computer-readable program code portions comprising:
an executable portion that recursively scans, commencing with a root directory, a plurality of data on a storage device of a host computer to generate a list of a plurality of files or directories to include in a backup plan;
an executable portion that, in conjunction with generating the list and during the scanning, determines whether currently scanned data of the plurality of files or directories in the recursive scan comprises one or more files or directories managed by one or more file hosting services, cloud computing services, or a combination thereof
an executable portion that, in response to determining the currently scanned data comprises the one or more files or directories managed by one or more file hosting services, cloud computing services, or a combination thereof, executes one or more extensible file system analyzer plugins, by the host, to obtain a state of the currently scanned data within the one or more file hosting services, cloud computing services, or a combination thereof, wherein obtaining the state includes natively communicating, by the one or more file system analyzer plugins on the host, with a respective one of the one or more file hosting services or cloud computing services on which the currently scanned data resides to determine whether the currently scanned data is to be excluded from the backup plan;
an executable portion that, in response to determining the currently scanned data should be excluded from the backup plan, generates a reference to the currently scanned data in the backup plan; and
an executable portion that performs a backup operation to backup those of the plurality of files or directories to a second storage device unassociated with the one or more file hosting services, cloud computing services, or a combination thereof according to the backup plan by only referencing within the backup to the second storage device, as opposed to including, entire content of the one or more files or directories that are managed by the one or more file hosting services, the cloud computing services, or a combination thereof, wherein the referencing includes backing up, within the storage device, only the reference to a current location of the managed one or more files or directories stored in the one or more file hosting services, the cloud computing services, or a combination thereof.

16. The computer program product of claim 15, further including an executable portion that maintains and updates references to the one or more files or directories managed by the one or more file hosting services, the cloud computing services, or a combination thereof.

17. The computer program product of claim 15, further including an executable portion that restores the one or more files or directories from a previous backup plan.

18. The computer program product of claim 15, further including an executable portion that:
- retrieves the one or more files or directories from the one or more file hosting services, the cloud computing services, or a combination thereof that are synchronized during the backup operation; or
- restores the one or more files or directories from the one or more file hosting services, the cloud computing services, or a combination thereof that are unsynchronized during the backup operation.

19. The computer program product of claim 15, further including an executable portion that resolves a conflict between versions of the one or more files or directories managed by the one or more file hosting services, the cloud computing services, or a combination thereof that are synchronized between the backup operation.

20. The computer program product of claim 15, further including an executable portion that backs up the one or more files or directories to a secondary backup system upon the one or more file hosting services, the cloud computing services, or a combination thereof being unavailable at a time of performing the backup.

\* \* \* \* \*